United States Patent
Vij

(10) Patent No.: US 11,904,723 B1
(45) Date of Patent: Feb. 20, 2024

(54) VEHICLE TO EXTERNAL LOAD CHARGER

(71) Applicant: Rivian IP Holdings, LLC, Irvine, CA (US)

(72) Inventor: Aashiv Vij, Los Alamito, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/343,573

(22) Filed: Jun. 28, 2023

(51) Int. Cl.
*B60L 55/00* (2019.01)
*H02J 7/00* (2006.01)
*B60W 10/26* (2006.01)

(52) U.S. Cl.
CPC ............. *B60L 55/00* (2019.02); *B60W 10/26* (2013.01); *H02J 7/0063* (2013.01); *H02J 7/007182* (2020.01)

(58) Field of Classification Search
CPC ....... B60L 55/00; B60W 10/26; H02J 7/0063; H02J 7/007182
USPC ........................................................... 320/103
See application file for complete search history.

(56) References Cited

U.S. PATENT DOCUMENTS

| | | | | |
|---|---|---|---|---|
| 8,143,843 B2 * | 3/2012 | Ichikawa | ................ | B60K 6/445 320/104 |
| 8,466,655 B2 * | 6/2013 | Mitsutani | ................ | B60L 50/16 320/109 |
| 8,796,991 B2 * | 8/2014 | Ohtomo | ................. | B60L 53/18 320/109 |
| 9,800,070 B2 * | 10/2017 | Ono | ......................... | B60L 53/18 |
| 10,183,741 B2 * | 1/2019 | Roeseler | ................. | B65D 85/68 |
| 10,393,881 B2 * | 8/2019 | Williams | ................ | G01C 21/30 |
| 11,258,112 B2 * | 2/2022 | Austin | ..................... | B60L 53/68 |
| 11,277,001 B2 * | 3/2022 | Kawamoto | ............... | H02J 7/00 |
| 11,358,490 B2 * | 6/2022 | Nakamura | ............. | B60L 53/14 |
| 11,427,100 B2 * | 8/2022 | Ando | ........................ | B60L 55/00 |
| 11,451,941 B2 * | 9/2022 | Heininger | .......... | G07C 9/00309 |
| 11,628,739 B2 * | 4/2023 | Erikson | ................. | B60L 53/305 320/109 |
| 11,701,983 B1 * | 7/2023 | Siu | .......................... | B60L 53/14 320/109 |

(Continued)

FOREIGN PATENT DOCUMENTS

| | | | | |
|---|---|---|---|---|
| EP | 3065255 B1 * | 9/2018 | .......... | B60L 11/1818 |
| WO | WO-2022061238 A1 * | 3/2022 | ............ | B60L 3/0069 |

OTHER PUBLICATIONS

A. Yadav, P. Kumar Koorata and B. Dastagiri Reddy, "Development of Fast Charging Control Algorithm for Electric Vehicles," 2022 IEEE 7th International Conference on Recent Advances and Innovations in Engineering (ICRAIE), Mangalore, India, 2022, pp. 367-372 (Year: 2022).*

(Continued)

*Primary Examiner* — M Baye Diao
(74) *Attorney, Agent, or Firm* — Foley & Lardner T.I.P

(57) ABSTRACT

A system is provided. The system can include a charger. The charger can electrically connect with a vehicle. The charger can transmit, responsive to occurrence of a triggering event, a first signal to the vehicle. The first signal can have a first voltage to cause the vehicle to direct a first power to the charger. The charger can transmit a second signal to the vehicle. The second signal can have a second voltage to cause the vehicle to direct a second power to the charger. The charger can supply the second power to a load connected to the charger.

18 Claims, 8 Drawing Sheets

(56) References Cited

U.S. PATENT DOCUMENTS

| | | | | |
|---|---|---|---|---|
| 2015/0212135 | A1* | 7/2015 | Jin | G01R 31/006 |
| | | | | 324/538 |
| 2016/0297313 | A1* | 10/2016 | Ono | H02J 3/322 |
| 2022/0185137 | A1* | 6/2022 | Cesiel | B60L 53/16 |
| 2022/0227254 | A1* | 7/2022 | Suzuki | B60L 53/665 |
| 2023/0054799 | A1* | 2/2023 | Takahashi | H02J 7/00308 |
| 2023/0094716 | A1* | 3/2023 | Zenner | B60L 1/006 |
| | | | | 320/109 |
| 2023/0095422 | A1* | 3/2023 | Pathipati | B60L 53/36 |
| | | | | 320/108 |
| 2023/0138878 | A1* | 5/2023 | Shin | B60L 3/0046 |
| | | | | 320/109 |
| 2023/0219446 | A1* | 7/2023 | Lu | B60L 55/00 |
| | | | | 320/109 |

OTHER PUBLICATIONS

M. M. Haque, L. Jones and B. C. P. Sturmberg, "Response of a Bidirectional EV Charger to Selected Grid Disturbances," 2021 IEEE Industrial Electronics and Applications Conference (IEACon), Penang, Malaysia, 2021, pp. 157-162, doi: 10.1109/IEACon51066. 2021.9654779. (Year: 2021).*

S. Semsar and P. W. Lehn, "V2X Operation of Integrated Single-Phase Bidirectional Electric Vehicle Charger," 2020 IEEE Applied Power Electronics Conference and Exposition (APEC), New Orleans, LA, USA, 2020, pp. 3527-3533, doi: 10.1109/APEC39645.2020. 9124195. (Year: 2020).*

* cited by examiner

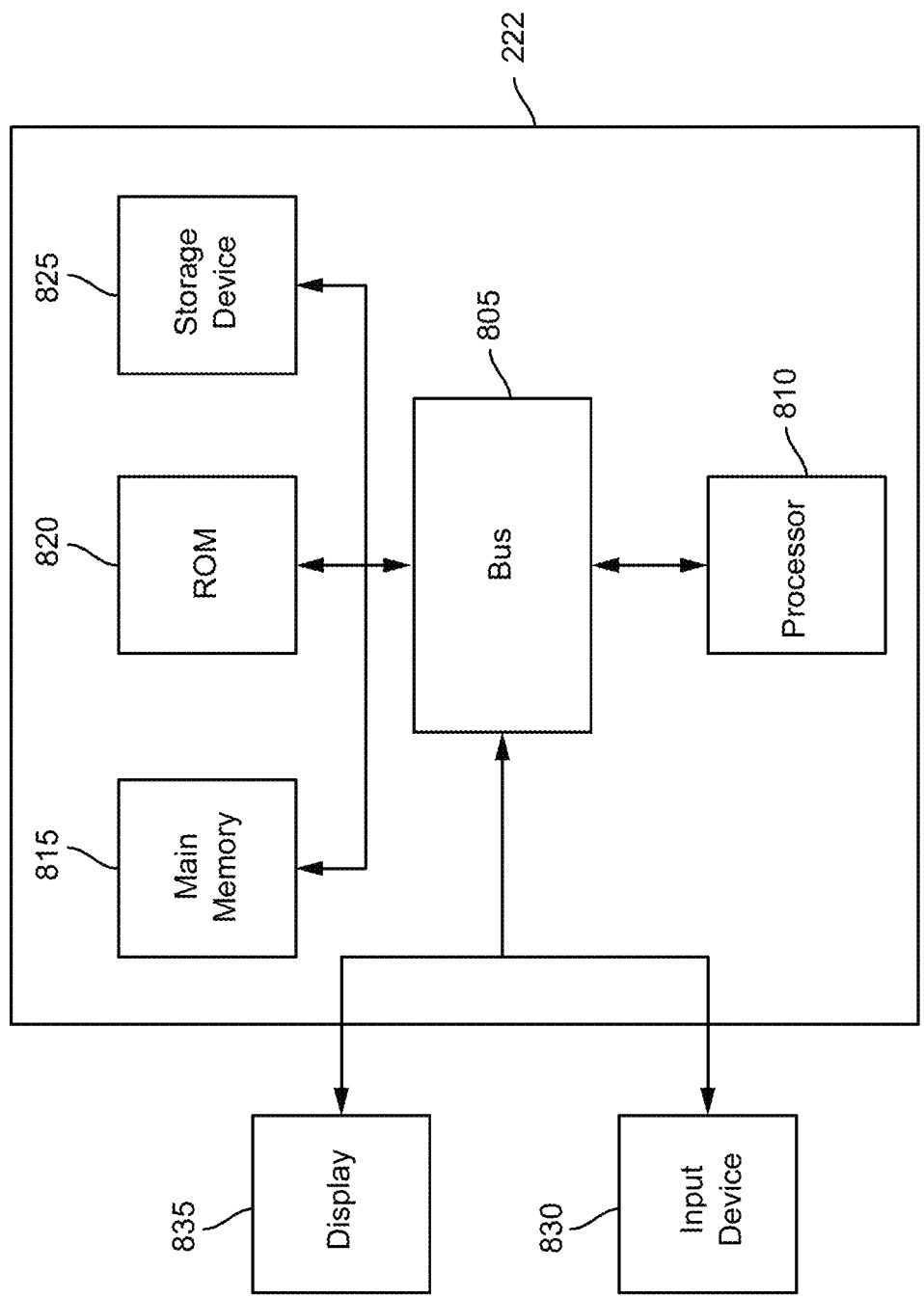

VEHICLE TO EXTERNAL LOAD CHARGER

INTRODUCTION

A vehicle, such as an electric vehicle, can store energy in a battery to reduce greenhouse gas emissions. The vehicle can use the energy to power different loads.

SUMMARY

This disclosure is generally directed to starting low voltage operation of a charger to facilitate a vehicle powering a load that stopped receiving power from an energy grid. For example, when a home is receiving power from an energy grid, the home may be disconnected from the energy grid or the energy grid can otherwise stop providing power to the home. When the home stops receiving power from the energy grid (or the energy grid otherwise stops providing power to the home), an external battery can be used to start low voltage operation of a charger connected to a vehicle. Starting low voltage operation of the charger can initiate discharge of the battery of the vehicle to power the home or at least one or more loads at the home. To avoid using an external battery to start low voltage operation at the charger, a control pilot voltage can be maintained (e.g., maintained at a steady voltage) with the vehicle. The control pilot voltage can be maintained in response to the home not receiving power from the energy grid for any reason. The control pilot voltage can be maintained by using a smaller energy source on board the charger, such as a supercapacitor or a coin cell battery. In addition to the control pilot voltage, a power line communication (e.g., radio frequency (RF) communication) of the charger can communicate with the vehicle to configure the charger for receiving power from the vehicle. The vehicle can detect the control pilot voltage. The vehicle can provide alternating current (AC) voltage to the charger in response to the control pilot voltage. The charger can use the AC voltage to restore low-voltage electronics of the charger. In doing so, the charger can initiate power transfer from the vehicle to the load or the grid.

At least one aspect is directed to a system. The system can include a charger to electrically connect with a vehicle. The charger can transmit, responsive to occurrence of a triggering event, a first signal to the vehicle, the first signal having a first voltage to cause the vehicle to direct a first power to the charger. The charger can transmit a second signal to the vehicle, the second signal having a second voltage to cause the vehicle to direct a second power to the charger. The charger can supply the second power to a load connected to the charger.

At least one aspect is directed to a vehicle. The vehicle can receive, responsive to occurrence of a triggering event, a first signal from a charger, the first signal having a first voltage. The vehicle can direct, based on the first voltage of the first signal, a first power to the charger. The vehicle can receive a second signal from the charger, the second signal having a second voltage. The vehicle can direct, based on the second voltage of the second signal, a second power to the charger, the charger supplying a load with the second power.

At least one aspect is directed to a system. The system can include a charger to electrically connect with a vehicle. The charger can detect presence of a triggering event. The charger can, responsive to detecting the presence of the triggering event, transmit a signal to the vehicle, the signal having a predetermined voltage. The charger can, responsive to transmitting the signal, receive power from the vehicle. The charger can supply the power to a load connected to the vehicle.

At least one aspect is directed to a system. The system can include a charger to electrically connect between a vehicle and a load. The load can be electrically connected to an energy grid. The charger can determine the load is not receiving power from the energy grid. The charger can, responsive to the determination that the load is not receiving power from the energy grid, transmit a signal to the vehicle, the signal having a predetermined voltage causing the vehicle to direct first power to the charger. The charger can activate, using the first power, circuitry of the charger configured for charging the load with power from the vehicle. The charger can, responsive to activating the circuitry, supply power from the vehicle to the load.

At least one aspect is directed to a method. The method can include transmitting, by a charger responsive to occurrence of a triggering event, a first signal to a vehicle, the first signal having a first voltage to cause the vehicle to direct a first power to the charger. The method can include transmitting, by the charger, a second signal to the vehicle, the second signal having a second voltage to cause the vehicle to direct a second power to the charger. The method can include supplying, by the charger, the second power to a load connected to the charger.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 8 is a block diagram illustrating an example architecture for a computer system that can be employed to implement elements of the systems and methods described and illustrated herein.

DETAILED DESCRIPTION

Figure 1:
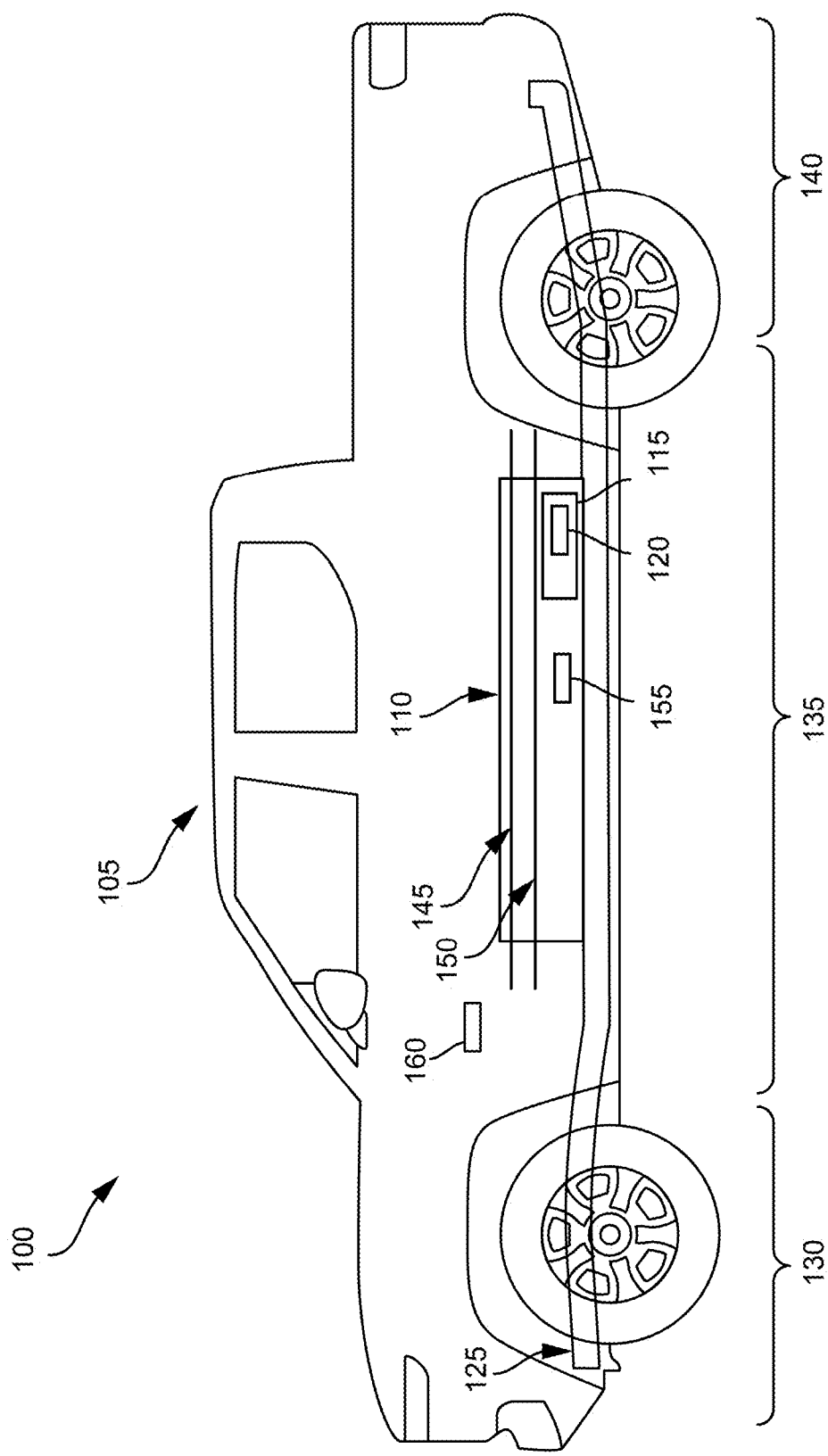
FIG. 1 depicts an example vehicle, in accordance with some implementations.

Following below are more detailed descriptions of various concepts related to, and implementations of, methods, apparatuses, and systems of powering an external load using a vehicle as a charger. The various concepts introduced above and discussed in greater detail below may be implemented in any of numerous ways.

Loads, such as homes or houses, can be powered by an energy grid. There can be instances in which the energy grid stops providing energy to or is otherwise disconnected from the loads. For example, a blackout at a house can occur when a power line is knocked down, such as by weather or other forces, or there is a malfunction at the electrical connection between the home and the energy grid. During a blackout, a load may not receive power from the energy grid, and the load may not be able to operate unless the load has a local power source from which to draw power.

One example of a local power source that a load can use as a power supply in the case of a blackout is a vehicle (e.g., an electric vehicle). For example, an electric vehicle can connect to a load (e.g., a house) through a charger. When a blackout occurs, the charger can draw power from the electric vehicle and deliver the power to the load. Using a battery to power the load instead of an internal combustion engine can reduce greenhouse emissions.

In some cases, the charger between the vehicle and the load may not have the power to initiate drawing power from the electric vehicle to power the load. For example, the charger can draw power from the energy grid for power and to facilitate operation. However, in the case of a blackout from the energy grid, the charger may not be able to draw power from the energy grid. Accordingly, the charger may not be able to draw power from the electric vehicle to power the load without the use of a local external power supply, which can increase costs and the amount of space to facilitate using the vehicle to power the load.

To solve these and other technical challenges, a charger can implement a control pilot voltage. The charger can use the control pilot voltage to cause a vehicle to provide low-voltage power to the charger. The charger can use the low-voltage power to perform system checks and to initiate drawing power from the vehicle to power a load. For example, a charger can include a capacitor (e.g., a supercapacitor) or another power source (e.g., a coin cell battery) that stores enough energy for the charger to maintain a control pilot voltage with a vehicle. The charger can be connected between the vehicle and a load and an energy grid. The energy grid can provide power to the load or the charger. The charger can determine the energy grid stopped or is no longer providing power to the load or the charger. Responsive to the determination, the charger can transmit or maintain a control pilot voltage with the vehicle that causes the vehicle to provide alternating current (AC) power to the charger. The charger can use the AC power to power or activate low-voltage electronics of the charger. The low-voltage electronics can facilitate directing power from the vehicle to the load. The charger can transmit a signal to the vehicle via a direct current (DC) line with a voltage that matches a voltage of the battery of the vehicle. Responsive to identifying the matching voltage at the DC line, the vehicle can direct DC power to the charger. The charger can receive the DC power, convert the DC power to AC power, and supply the load with the converted AC power. Accordingly, the charger can power the load using power from the vehicle in the case of a blackout without the use of an external power supply.

The charger can change the state of the control pilot voltage to adjust the power that the vehicle directs to the charger. For example, responsive to detecting the vehicle connected to the charger, the charger can transmit a control pilot voltage through the connection to the vehicle to cause the vehicle to enter into a state for charging a battery of the vehicle. The charger can detect a triggering event (e.g., a blackout at the load or the charger). In response to detecting the triggering event, the charger can change a characteristic of the control pilot signal (e.g., a duty cycle, amplitude, average voltage, or frequency of the control pilot voltage) to cause the vehicle to direct AC power to the charger. The charger can use the AC power from the vehicle to activate the low-voltage electronics of the charger. The charger can transmit a signal to the vehicle via a DC connection to cause the vehicle to discharge DC power to the charger to forward to the load. The charger can update the control pilot signal to cause the vehicle to stop transmitting the AC power to the charger.

FIG. 1 depicts an example cross-sectional view 100 of a vehicle 105 installed with at least one battery pack 110. The vehicle 105 can be an electric vehicle. The vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. The vehicles 105 can be fully electric or partially electric (e.g., plug-in hybrid) and further, vehicles 105 can be fully autonomous, partially autonomous, or unmanned. The vehicles 105 can also be human operated or non-autonomous. The vehicles 105 such as electric trucks or automobiles can include on-board battery packs 110, batteries 115 or battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar (e.g., a current collector element). For example, the first busbar 145 and the second busbar 150 can include electrically conductive material to connect or otherwise electrically couple the battery 115, the battery modules 115, or the battery cells 120 with other electrical components of the vehicle 105 to provide electrical power to various systems or components of the vehicle 105.

The vehicle 105 can include an on-board charger 155. The on-board charger 155 can include a port for receiving power from a charger. The on-board charger 155 can receive AC power from a charger or direct AC power from one of the batteries 115 of the vehicle 105 to an external load. The on-board charger 155 can be configured to direct or receive AC power of any voltage or power.

The vehicle 105 can include a controller 160. The controller 160 can include one or more processors and memory. The controller 160 can be configured to control operation of different components of the vehicle 105. In one example, the controller 160 can control the charge and discharge of the on-board charger 155 or the batteries 115 for charging an external load. The controller 160 can control the contactors (e.g., open and close the contactors) of the batteries 115 to enable the batteries 115 to be charged or discharged.

Figure 2:
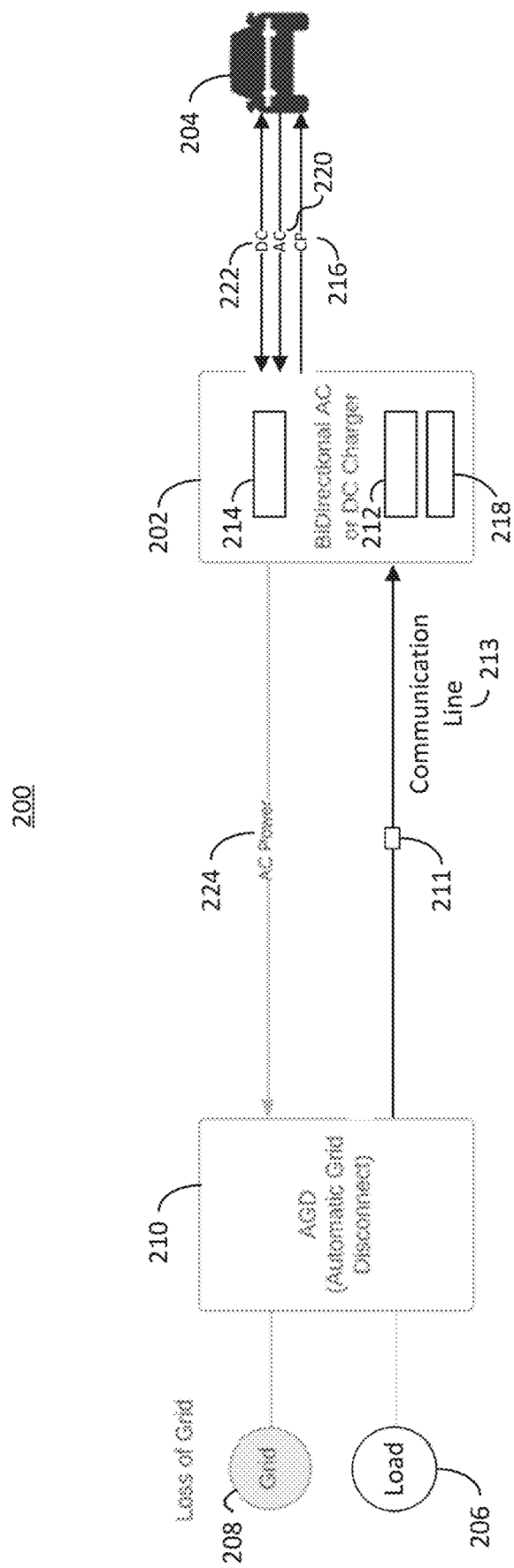
FIG. 2 depicts an example system for powering an external load, in accordance with some implementations.

FIG. 2 depicts an example system 200 for powering an external load. The system 200 can include a charger 202, a vehicle 204, a load 206, an energy grid 208, and a disconnect 210. The vehicle 204 can be the same as or similar to the vehicle 105. The vehicle 204 and the charger 202 can operate together to power the load 206, such as in cases in which the load 206 stops receiving energy from the energy grid 208.

For example, the charger 202 can monitor the disconnect 210. The charger 202 can detect that the energy grid 208 is no longer powering the load 206 or the occurrence of another triggering event. Responsive to detecting the occurrence of the triggering event, the charger 202 can transmit a signal to the vehicle 204 to initiate a charging session in which the vehicle discharges power to the load 206 through the charger 202. The vehicle 204 can direct AC power to the charger 202 to activate low-voltage electronics 212 of the charger 202. The vehicle 204 can transmit a signal to the vehicle 204 to cause the vehicle 204 to direct DC power to the charger 202. The charger 202 can convert the DC power to AC power and direct the converted AC power to the load 206 to power the load 206. Accordingly, the charger 202 can facilitate powering of the load 206 using energy stored in the vehicle 204 in cases in which the energy grid 208 is not powering the load 206 or the charger 202.

The charger 202 can be a device that is configured to charge the vehicle 204 with energy from the energy grid 208. The charger 202 can be located adjacent to a person's home (e.g., in a garage) or otherwise adjacent (e.g., within 100 feet) to the load 206. The charger 202 can couple (e.g., electrically connect) the vehicle 204 with the load 206 or the energy grid 208, such as through the disconnect 210. The charger 202 can receive power from the energy grid 208 and use the power to charge the vehicle 204. The charger 202 can also be configured to facilitate the transfer of power from the vehicle 204 to the load 206, such as to power the load. The charger 202 can connect with the vehicle 204 through three separate connections (e.g., wired connections) that operate to facilitate the transfer of power to or from the vehicle 204. The load 206 can be any type of device or set of devices that is powered with energy from the energy grid 208. The load 206 can be or include, for example, a building (e.g., a house, a commercial building, or an apartment complex), devices of a building (e.g., heating, ventilation, or air equipment, or lights), or any other type of load. The load 206 can draw power from the energy grid 208 at all times or for set time periods (e.g., during daytime hours, such as from 7 AM to 8 PM). The load 206 can be connected with the charger 202 to receive power from the charger 202, such as in cases in which the energy grid 208 is not providing power to the load 206. The load 206 can be connected with the energy grid 208 or the charger 202 through the disconnect 210.

The disconnect 210 can be or include an automatic grid disconnect. The disconnect 210 can be a device or component that connects or couples the energy grid 208 with the load 206 or the charger 202. The disconnect 210 can include a disconnect switch, sensors or transducers that measure electrical characteristics of the energy grid 208 or the connection between the disconnect 210 and the energy grid 208, and one or more processors configured to control the disconnect 210. The disconnect 210 can measure the electrical characteristics (e.g., voltage, current, or amount of power traveling through the disconnect 210) of the energy grid 208 or the connection between the energy grid 208 and the disconnect 210. The one or more processors can automatically disconnect the disconnect 210 from the energy grid 208 (e.g., disconnect the disconnect switch from the energy grid 208) based on the measurements.

For example, the disconnect 210 can be configured to automatically disconnect the charger 202 or the load 206 from the energy grid 208 in response to determining a condition is satisfied. The disconnect 210 can disconnect from the energy grid 208, for example, when one or more processors of the disconnect 210 determine one or more of the measurements are less than the threshold, the measurements are less than the threshold for at least a defined time period, a defined percentage of the measurements are less than the threshold for a defined time period, or that any other condition is met. In doing so, for example, the disconnect 210 can detect grid faults (e.g., voltage fluctuations, frequency deviations, or a current exceeding a threshold), a sudden loss of grid power, or a disconnection from the energy grid 208. Responsive to determining a condition is satisfied, the disconnect 210 can disconnect the disconnect switch of the disconnect 210 such that the energy grid 208 is not electrically connected with the disconnect 210.

In response to disconnecting from the energy grid 208, the disconnect 210 can transmit a signal 211 (e.g., a message) to the charger 202. The disconnect 210 can transmit the signal 211 to the charger 202 via a communication line 213, such as over a network or via a communication session that the disconnect 210 has established with the charger 202. The charger 202 can receive the signal 211. Responsive to receiving the signal 211, the charger 202 can operate to facilitate powering the load 206 with power from the vehicle 204.

A controller 214 of the charger 202 can include or execute on one or more processors or computing devices. The controller 214 can be located on (e.g., be electrically connected to the circuitry of) the charger 202 or be at a location remote from the charger 202. In one example, the controller 214 can be operating the cloud and communicate with the different components of the charger 202. The controller 214 can communicate with components of the vehicle 204 or the disconnect 210 over a network (e.g., a wireless network or a wired network). The controller 214 can include hardware elements, such as one or more processors, logic devices, circuits, or memory.

The controller 214 can determine to power the load 206 with power from the vehicle 204 based on at least one or more messages from the disconnect 210 or by monitoring electrical characteristics of the disconnect 210. For example, the controller 214 can measure the current or voltage at the disconnect that indicates the amount of power the energy grid 208 is providing to the load 206 or the charger 202. The controller 214 can compare the measurements to a threshold or another condition. Responsive to determining the measurements do not exceed the threshold or do not otherwise satisfy a condition, the controller 214 can determine the energy grid 208 is not supplying power to the load 206 (e.g., detect or determine an occurrence of a triggering event). Responsive to determining the energy grid 208 is not supplying power to the load 206, the controller 214 can facilitate powering the load 206 with power from the vehicle 204.

Responsive to detecting the occurrence of a triggering event (e.g., responsive to receiving a message from the disconnect 210 indicating a disconnect of the disconnect 210 from the energy grid 208 or responsive to determining one or more measurements satisfy a condition), the controller 214 can transmit a signal (e.g., a first signal) to the vehicle 204. The signal can be or include a control pilot signal 216 that the controller 214 transmits over a first connection with the vehicle 204. The control pilot signal 216 can be an AC voltage signal or a DC voltage signal. The controller 214 can transmit the control pilot signal 216 with a duty cycle, amplitude, average voltage, or frequency that corresponds to the occurrence of the triggering event. The vehicle 204 can receive the control pilot signal 216 and operate to direct AC power to the charger 202.

The controller 214 can generate or transmit the control pilot signal 216 to have a duty cycle, amplitude, average voltage, or frequency that corresponds to the occurrence of the triggering event. For example, the controller 214 can store, in memory, a database that includes sets of characteristics for different control pilot signals. Each set of characteristics can include one or more of a duty cycle, an amplitude, an average voltage, or a frequency for a control pilot signal. The different control pilot signals can correspond to different states of the vehicle 204, such as a backup state when the vehicle 204 operates as a backup power supply for the charger 202, a charging state in which the vehicle 204 is configured for charging by the charger 202, and a discharging state in which the vehicle 204 is configured for discharging to the load 206 through the charger 202. For instance, responsive to detecting or determining the occurrence of the triggering event, the controller 214 can select the set of characteristics of the control pilot signal that corresponds to the detection or determination of an occurrence of a triggering event. The controller 214 can generate or transmit the control pilot signal 216 to have the selected set of characteristics.

The charger 202 can transmit the control pilot signal 216 to the vehicle 204 using power from an energy storage device 218. The energy storage device 218 can be a battery (e.g., a coin cell battery) or a capacitor (e.g., a supercapacitor) configured to store energy. The charger 202 can be configured to only use power from the energy storage device 218 in cases in which the charger 202 is not receiving power from the energy grid or responsive to detecting or determining the occurrence of a triggering event. For example, responsive to detecting the occurrence of the triggering event (e.g., the energy grid 208 is not providing power to the load 206 or the charger 202), the charger 202 can draw energy from the energy storage device 218 to use to transmit the control pilot signal 216 to the vehicle 204.

The charger 202 can transmit the control pilot signal 216 in response to the occurrence of the triggering event by adjusting one or more characteristics of the control pilot signal 216. For example, the charger 202 can transmit the control pilot signal 216 to the vehicle 204 automatically responsive to the vehicle 204 connecting to the charger 202. The control pilot signal 216 can be a control signal that initially causes the vehicle 204 to configure for charging using power from the charger 202 (e.g., power from the energy grid 208). The charger 202 can transmit the control pilot signal 216 to the vehicle 204 to cause the vehicle 204 to enter a charging state (e.g., close the contactors of the battery of the vehicle 204 (e.g., the battery 115)) responsive to connecting with the vehicle 204. Responsive to determining or detecting the occurrence of the triggering event, the controller 214 can adjust the characteristics (e.g., the duty cycle, amplitude, average voltage, or frequency) of the control pilot signal, such as by using power from the energy storage device 218. The controller 214 can adjust the characteristics to match stored characteristics that correspond to a configuration in which the vehicle 204 provides power to the charger 202. In one example, the controller 214 can adjust the characteristics to cause the control pilot signal 216 to have a defined average voltage that corresponds to a backup state in which the vehicle 204 powers the low-voltage electronics 212.

The charger 202 can transmit the control pilot signal 216 to the vehicle 204 to cause the vehicle 204 to direct AC power 220 to the charger 202. The vehicle 204 can direct the AC power 220 to the charger 202 through an on-board charger (e.g., the on-board charger 155) of the vehicle 204. The AC power 220 can have an alternating current voltage. The vehicle 204 can direct the AC power 220 to the charger 202 over a second connection (e.g., a wired connection). For example, one or more processors (e.g., one or more processors of the controller 160) of the vehicle 204 can be configured to analyze the characteristics (e.g., frequency, amplitude, duty cycle, average voltage) of the control pilot signal 216. The one or more processors can adjust the state of the vehicle 204 for charging with power from the charger 202 or discharging power to the charger 202 based on the characteristics of the control pilot signal 216. In a first state, the one or more processors can facilitate charging of the battery of the vehicle 204 using power from the charger 202. The first state can be a charging state. In a second state, the one or more processors can direct power (e.g., the AC power 220) to the charger 202. The second state can be a backup state. The AC power 220 can power the low-voltage electronics 212 of the charger 202. The vehicle 204 can direct the AC power 220 to the charger 202 through an on-board charger (e.g., the on-board charger 155) of the vehicle 204. The one or more processors can analyze the characteristics of the control pilot signal 216 and compare the characteristics to a database that stores associations between such characteristics and states of the vehicle. The one or more processors can identify a state in the database that correspond to characteristics that match the control pilot signal 216 to determine the control pilot signal 216 indicates for the vehicle 204 to be in the second state. Responsive to determining the control pilot signal 216 indicates for the vehicle 204 to be in the second state, the one or more processors can adjust the state of the vehicle 204 to be in the second state and direct the AC power 220 to the charger 202.

The charger 202 can receive the AC power 220. The charger 202 can activate the low-voltage electronics 212 of the charger 202 using the AC power 220. For example, the charger 202 can direct the AC power 220 through the charger 202 to turn on or otherwise power the low-voltage electronics 212. The low-voltage electronics 212 can include circuitry that monitors the battery voltage and current of the charger 202 during the charging or discharging process. The low-voltage electronics 212 can include components for overcharge protection, short-circuit protection, or temperature monitoring. The low-voltage electronics 212 can be configured to activate or operate at low voltages (e.g., voltages up to 14V or any other range). Upon activation, the low-voltage electronics 212 can operate to perform checks of other internal components of the charger 202 to ensure the charger 202 can operate to direct power received from the vehicle 204 to the load 206.

The low-voltage electronics 212 can communicate with the vehicle 204. For example, upon activation, the low-voltage electronics 212 can include a communication interface or network interface through which the low-voltage electronics 212 transmits (e.g., using RF communication) a query to the vehicle 204 for a voltage of the battery of the vehicle 204. The vehicle 204 can transmit a message back to the low-voltage electronics 212 indicating the voltage of the battery of the vehicle 204. The low-voltage electronics 212 can transmit the indication of the voltage of the battery of the vehicle 204 to the controller 214. Any component of the charger 202 can transmit a query to the vehicle 204 for the voltage of the battery of the vehicle 204.

The charger 202 can transmit a signal (e.g., a second signal) to the vehicle 204. The controller can transmit the signal to the vehicle 204 responsive to the activation of the low-voltage electronics 212, responsive to receiving an indication that the checks performed by the low-voltage electronics 212 are complete, or responsive to receiving the AC power 220 from the vehicle 204. The charger 202 can transmit the signal by applying a DC voltage (e.g., a DC voltage of 400V or in the range of 380V to 450V) to a DC connection (e.g., a DC line or a third connection) between the charger 202 and the vehicle 204. The charger 202 can apply the same DC voltage to the DC connection that the charger 202 received from the vehicle 204 (e.g., the charger 202 can identify the DC voltage from the message from the vehicle 204 and apply the same DC voltage to the DC connection based on the identification of the DC voltage from the message). The charger 202 can transmit the signal to the vehicle 204 using the AC power 220 that the charger 202 receives from the vehicle 204.

The vehicle 204 can receive the signal from the charger 202 (e.g., identify the voltage of the DC connection between the charger 202 and the vehicle 204). The one or more processors of the vehicle 204 can compare the voltage of the signal with a voltage of the battery of the vehicle 204. Responsive to determining the voltage of the signal matches the voltage of the battery of the vehicle 204, the one or more processors can cause contactors of the battery of the vehicle 204 to close (entering the backup state can cause the contactors to open). Thus, the one or more processors can enable the battery to discharge or direct power across the DC connection between the charger 202 and the vehicle 204. The one or more processors can discharge the battery of the vehicle 204 to cause the vehicle 204 to direct DC power 222 (e.g., second power) from the battery of the vehicle 204 across the DC connection with the charger 202. The DC power 222 can have a second DC voltage different or the same as the first DC voltage that the charger 202 applied to the DC connection.

The charger 202 can receive the power from the battery of the vehicle 204. The charger 202 can invert or convert the power from DC power to AC power 224 using inverter circuitry (e.g., an H-bridge or other inverting circuitry). The charger 202 can direct or supply the AC power 224 to the load 206, such as across the disconnect 210. Accordingly, the charger 202 can power the load 206 in cases in which the energy grid 208 is not supplying power to the load 206 or the charger 202 without an external power supply to activate the low-voltage electronics 212 of the charger 202.

Responsive to receiving the DC power 222 from the vehicle 204 or supplying the AC power 224 to the load 206, the charger 202 can, via the controller 214, adjust the characteristics of the control pilot signal 216. The charger 202 can adjust the characteristics, for example, by increasing or decrease the duty cycle, the frequency, the average voltage, or the amplitude of the control pilot signal 216. The charger 202 can adjust the characteristics by selecting a different set of characteristics from memory and changing the characteristics of the control pilot signal 216 to the selected set of characteristics. The charger 202 can adjust the characteristics of the control pilot signal to correspond to a state of the vehicle 204 in which the vehicle 204 stops directing the AC power 220 to the charger 202 and continues to direct the DC power 222 to the charger 202. For example, the charger 202 can transmit a signal (e.g., a third signal) to the vehicle 204 in the control pilot signal 216 that has a voltage (e.g., a third voltage) that corresponds to a third state in which the vehicle does not direct the AC power 220 to the charger 202 and directs the DC power 222 to the charger 202. The one or more processors of the vehicle 204 can identify the adjusted characteristics of the control pilot signal 216 and adjust the state of the vehicle 204 according to the adjusted characteristics (e.g., the one or more processors can cause the vehicle 204 to enter a state to stop transmitting the AC power 220 to the charger 202 while continuing to direct the DC power 222 to the charger 202). Accordingly, the charger 202 can operate to conserve energy resources at the vehicle 204.

Figure 3:
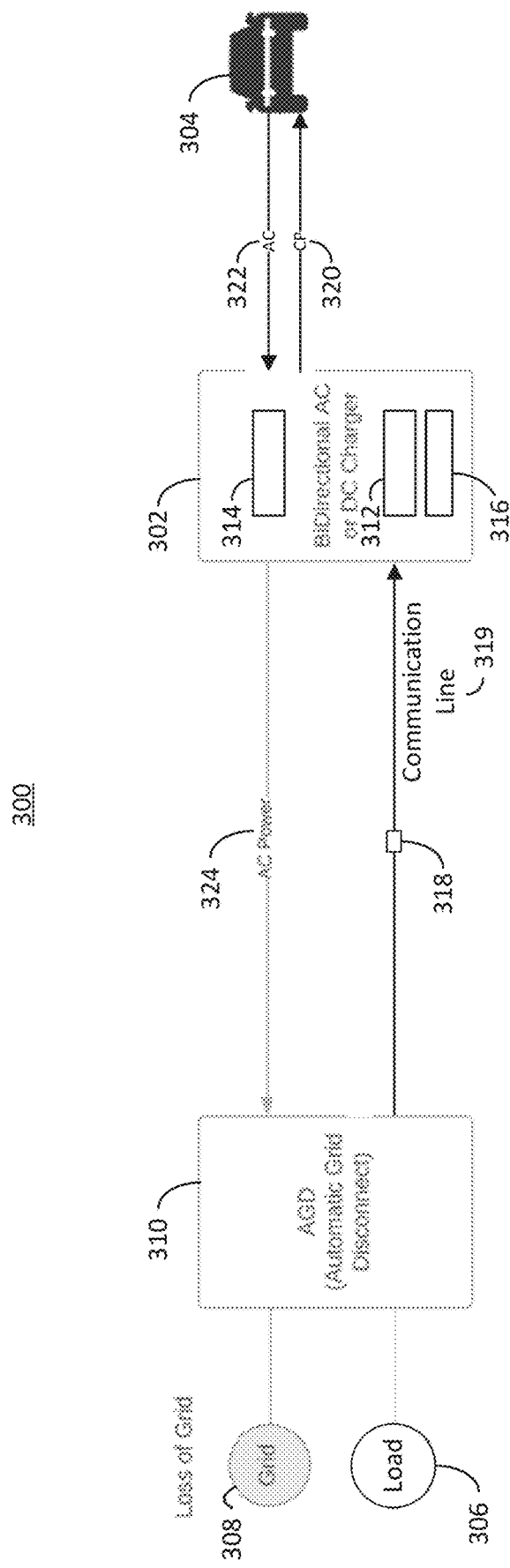
FIG. 3 depicts an example system for powering an external load, in accordance with some implementations.

FIG. 3 depicts an example system 300 for powering an external load. The system 300 can include a charger 302, a vehicle 304, a load 306, an energy grid 308, and a disconnect 310. The vehicle 304 can be the same as or similar to the vehicle 105 or the vehicle 204. The charger 302 can be the same as or similar to the charger 202. The load 306 can be the same as or similar to the load 206. The energy grid 308 can be the same as or similar to the energy grid 208. The vehicle 304 can be configured to power the load 306 by directing AC power to the load 306. The vehicle 304 and the charger 302 can operate together to power the load 306, such as in cases in which the load 306 stops receiving energy from the energy grid 308.

The charger 302 can detect (e.g., via a controller 314 of the charger 302) that the energy grid 308 is no longer powering the load 306 or the occurrence of another triggering event. The charger 302 can do so based on measurements that the charger 302 collects at the disconnect 310 or based on a message 318 that the disconnect 310 transmits to the charger 302 via a communication line 319. For example, the charger 302 can receive measurements indicating the amount of power or current the energy grid 308 is providing to the load 306 through the disconnect 310. The charger 302 can compare the measurements to a threshold. Responsive to determining the measurements are less than the threshold, the measurements are less than the threshold for at least a defined time period, a defined percentage of the measurements are less than the threshold for a defined time period, or that any other condition is met, the charger 302 can detect or determine the occurrence of a triggering event. The charger 302 can additionally or instead determine or detect the occurrence of a triggering event in response to receiving a message from the disconnect 310 indicating the disconnect 310 has disconnected from the energy grid 308.

Responsive to detecting the occurrence of the triggering event, the charger 302 can transmit a signal 320 to the vehicle 304. The charger 302 can transmit the signal 320 to the vehicle 304 using power from an energy storage device 316 can be a battery (e.g., a coin cell battery) or a capacitor (e.g., a supercapacitor) configured to store energy similar to the energy storage device 218. The charger 302 can be configured to only use power from the energy storage device 316 in cases in which the charger 302 is not receiving power from the energy grid 308 or responsive to detecting or determining the occurrence of a triggering event. For example, responsive to detecting the occurrence of the triggering event (e.g., the energy grid 308 is not providing power to the load 306 or the charger 302), the charger 302 can draw power from the energy storage device 316 to use to transmit the signal 320.

The signal 320 can be a control pilot signal to change the state of the vehicle 304 to the state in which the vehicle 304 provides backup power to the charger 302 to power low-voltage electronics 312 of the charger 302. The vehicle 304 can transmit the signal 320 to the vehicle 304 by adjusting characteristics (e.g., frequency, amplitude, duty cycle, or average voltage) of the signal 320 that the vehicle 304 had previously transmitted to the vehicle 304 responsive to the vehicle 304 connecting with the charger 302. The previous signal may have indicated for the charger 302 to enable charging of the vehicle 304 with power from the energy grid 308. The vehicle 304 can receive (e.g., through one or more processors of the vehicle 304) the signal 320 from the charger 302 and adjust the state of the vehicle 304 to provide backup power to the charger 302.

In the backup state in which the vehicle 304 is configured to provide backup power to the charger 302, the vehicle 304 can direct power 322 (e.g., a first AC power) to the charger 302. The charger 302 can receive the power 322 and use the power 322 to activate the low-voltage electronics 312 of the charger 302. Upon activation, the low-voltage electronics 312 can operate to perform checks of other internal components of the charger 302 to ensure the charger 302 can forward power received from the vehicle 304 to the load 306. The low-voltage electronics 312 can generate or transmit a signal to the controller 314 responsive to determining the checks are complete.

The charger 302 can transmit a signal 320 (e.g., a second signal) to the vehicle 304. The charger 302 can transmit the signal 320 to the vehicle 304 responsive to the activation of the low-voltage electronics 312, responsive to receiving an indication that the checks performed by the low-voltage electronics 312 are complete, or responsive to receiving the power 322 from the vehicle 204. The charger 302 can transmit the signal 320 by adjusting the characteristics of the signal 320. For example, the initial characteristics of the signal 320 can include a first duty cycle, amplitude, average voltage, or frequency. The charger can adjust the initial characteristics of the signal to include a second duty cycle, amplitude, average voltage, or frequency. The charger 302 can adjust the amplitude, duty cycle, frequency, or average voltage of the signal 320 to correspond to a discharge state of the vehicle 304. The vehicle 304 can receive the adjusted signal 320 and change states to the discharge state based on the adjusted characteristics of the signal 320.

In changing states to the discharge state, the vehicle 304 can increase the power 322. The vehicle 304 can increase the power 322 to an AC power that corresponds to the discharge state of the vehicle. In one example, the vehicle 304 can increase the voltage of the power 322 from a first AC voltage to a second AC voltage higher than the first AC voltage. The charger 302 can receive the increased power 322 and direct the increased power 322 to the load 306 through the disconnect 310 as power 324 (e.g., second AC power). Thus, the vehicle 304 can power the load 306.

Figure 4:
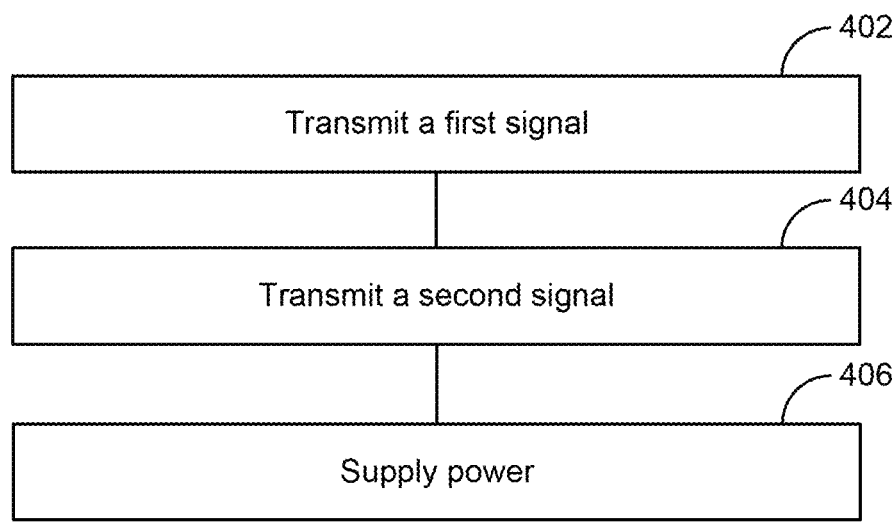
FIG. 4 depicts an example method for powering an external load, in accordance with some implementations.

FIG. 4 depicts an example method 400 for powering an external load, in accordance with some implementations. The method 400 can be performed by one or more components depicted in the system 200 or the controller 214 of FIG. 2 or the system 300 or the controller 314 of FIG. 3. For example, the method 400 can be performed by a charger (e.g., the charger 202, shown and described with reference to FIG. 2, or the charger 302, shown and described with reference to FIG. 3). The method 400 can include transmitting a first signal (ACT 402). The method 400 can include transmitting a second signal (ACT 404). The method 400 can include supplying power (ACT 406). By performing the method 400, a vehicle can operate to provide backup power to a charger to initiate charging of a load experiencing a blackout (e.g., a disconnect from an energy grid) or another triggering event.

At ACT 402, the method 400 can include transmitting a first signal. The charger 202 can transmit the signal 216 to the vehicle 204. The charger 202 can transmit the signal 216 in response to the occurrence of a triggering event. The charger 202 can generate and transmit the signal 216 such that the signal 216 has a first voltage. The first voltage can be an average voltage of the signal 216. The charger 202 can define the first voltage with a duty cycle, amplitude, or frequency of the signal 216. The first voltage can correspond to a backup state of the vehicle 204 in which the vehicle 204 provides power to the charger 202 to activate or power the low-voltage electronics 212 of the charger 202.

The charger 202 can detect or determine the occurrence of the triggering event. For example, the charger 202 can detect or determine the occurrence of the triggering event responsive to receiving the signal 211 from the disconnect 210 that indicates the disconnect 210 disconnected the load 206 from the energy grid 208. The charger 202 can detect or determine the occurrence of the triggering event by monitoring the disconnect 210. The charger 202 can determine the amount of power or current is flowing from the energy grid 208 to the load 206 or otherwise through the disconnect 210. Responsive to determining the amount of power or current flowing through the disconnect 210 or to the load 206 is less than a threshold or is a defined value (e.g., zero), the charger 202 can determine or detect the occurrence of the triggering event.

The vehicle 204 can determine a state for the vehicle 204 based on the signal 216. For example, the vehicle 204 can receive the signal 216 and analyze the characteristics of the signal 216. The vehicle 204 can determine the state for the vehicle 204 to be a backup state in which the vehicle 204 directs or discharges the AC power 220 (e.g., the first power) to the charger. The vehicle 204 can determine the state and change or adjust the state of the vehicle 204 to the backup state. In doing so, the vehicle 204 can begin discharging the AC power 220 to the charger 202, such as through an on-vehicle charger of the vehicle 204.

The charger 202 can receive the AC power 220. The charger 202 can use the AC power 220 to activate the low-voltage electronics 212 of the charger 202. Upon activation, the low-voltage electronics 212 can operate to perform checks of other internal components of the charger 202 to ensure the charger 202 can forward power received from the vehicle 204 to the load 206. The low-voltage electronics 212 can generate or transmit a signal to the controller 214 responsive to determining the checks are complete.

The charger 202 can transmit a query (e.g., a message) to the vehicle 204. The query can be for a voltage of the battery of the vehicle 204. The charger 202 can transmit the query using the low-voltage electronics 212 or another communication interface or network interface of the charger 202. The charger 202 can transmit the query using the AC power 220 that the vehicle 204 directs to the charger 202. The vehicle 204 can receive the query and transmit a response to the query to the charger 202 that contains the voltage of the battery of the vehicle 204.

At ACT 404, the method 400 can include transmitting a second signal. The charger 202 can transmit the second signal to the vehicle 204 across a DC connection that the charger 202 has with the vehicle 204. The charger 202 can transmit the second signal to the vehicle 204 by applying a DC voltage to the DC connection that matches the voltage of the battery of the vehicle 204. In doing so, the charger 202 can apply the DC voltage that the vehicle 204 indicated to the charger 202 in the message that the vehicle 204 transmitted to the charger 202.

The vehicle 204 can identify the voltage of the second signal. The vehicle 204 can compare the voltage of the second signal to the voltage of the battery of the vehicle 204. Responsive to determining the two voltages match, the vehicle 204 can close contactors of the battery of the vehicle 204. The vehicle 204 can discharge second power (e.g., DC power) from the battery of the vehicle 204 to the charger 202 through the DC connection.

At ACT 406, the method 400 can include supplying the second power to the load 206. The charger 202 can receive the second power from the vehicle 204 across the DC connection. The charger 202 can convert the second power from DC to AC. The charger 202 can direct the converted second power to the load 206. In doing so, the charger 202 can facilitate the vehicle 204 providing power to the charger 202 as a backup power supply and supplying power to the load 206 in the case of a triggering event.

Figure 5:
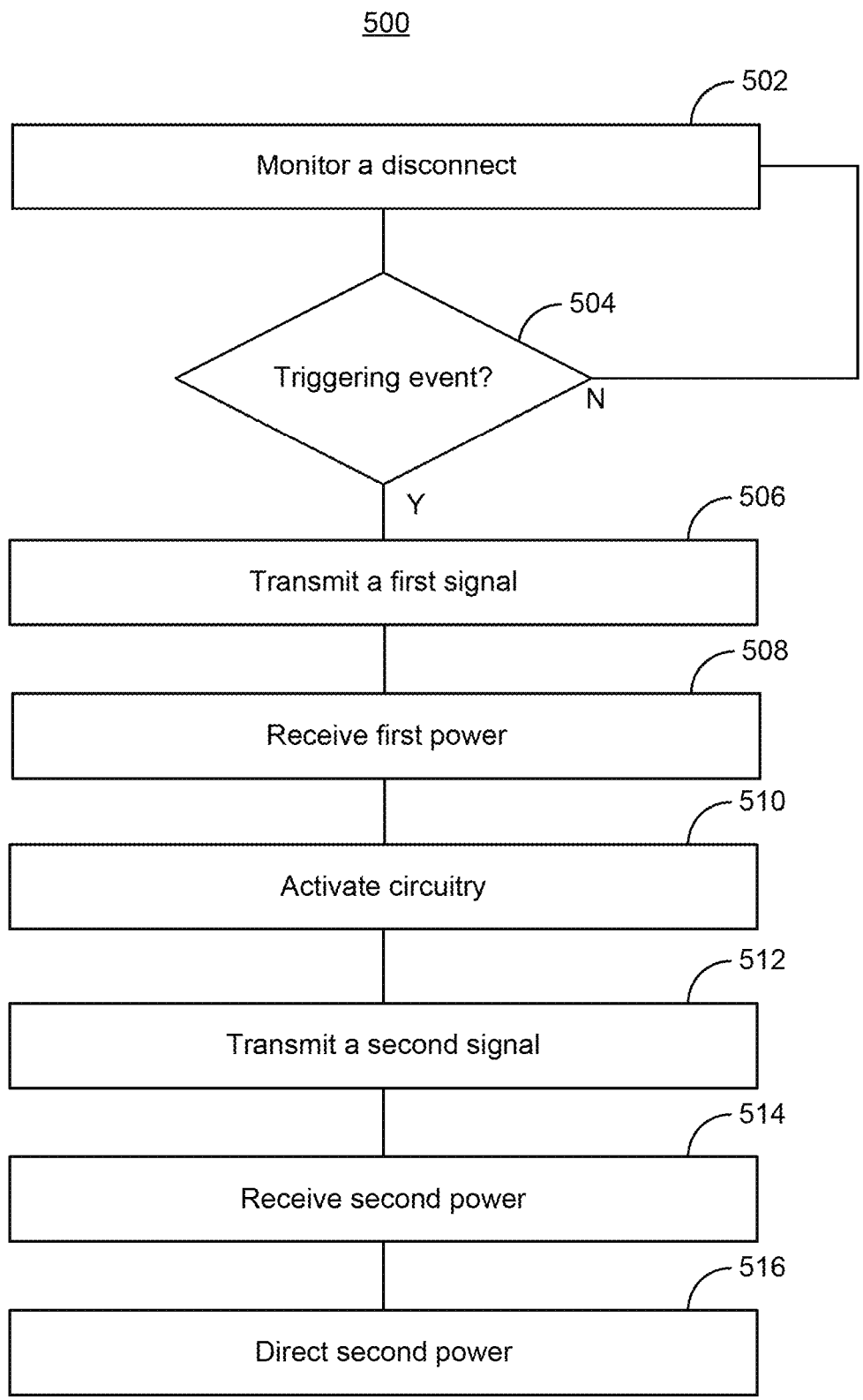
FIG. 5 depicts an example method for powering an external load, in accordance with some implementations.

FIG. 5 depicts an example method 500 for powering an external load, in accordance with some implementations. The method 500 can be performed by one or more components depicted in the system 200 or the controller 214 of FIG. 2 or the system 300 or the controller 314 of FIG. 3. For example, the method 500 can be performed by a charger (e.g., the charger 202, shown and described with reference to FIG. 2, or the charger 302, shown and described with reference to FIG. 3). The method 500 can include monitoring a disconnect (ACT 502). The method 500 can include determining whether a triggering event occurred (ACT 504). The method 500 can include transmitting a first signal (ACT 506). The method 500 can include receiving a first power (ACT 508). The method 500 can include activating circuitry (ACT 510). The method 500 can include transmitting a second signal (ACT 512). The method 500 can include receiving a second power (ACT 514). The method 500 can include directing second power (ACT 516). By performing the method 500, a vehicle can operate to provide backup power to a charger to initiate charging of a load experiencing a blackout (e.g., a disconnect from an energy grid) or another triggering event.

At ACT 502, the method can include monitoring a disconnect. The charger 202 can monitor the disconnect 210. The charger 202 can monitor the disconnect 210 by monitoring different characteristics of the electrical connection between the disconnect 210 and the energy grid 208. For example, the charger 202 can collect measurements from sensors that indicate the current or voltage at the connection between the energy grid 208 and the disconnect 210 or the amount of power or energy that is flowing from the energy grid 208 to the disconnect 210.

At ACT 504 the method 500 can include determining whether a triggering event occurred. The charger 202 can compare the measurements from the disconnect 210 to one or more conditions. For example, the charger 202 can determine whether one or more of the measurements are less than a threshold. Responsive to determinizing a condition is not satisfied based on the measurements, the method 500 can return to ACT 502. However, responsive to determining one or a defined number of measurements, for example, are less than the threshold, the charger 202 can determine a condition is satisfied. The charger 202 can detect or determine an occurrence of a triggering event responsive to or based on determining the condition is satisfied.

Responsive to the charger 202 detecting or determining the occurrence of the triggering event, at ACT 506, the method 500 can include transmitting a first signal. The charger 202 can transmit the signal 216 to the vehicle 204 via a first connection (e.g., a wired connection) between the charger 202 and the vehicle 204. The signal 216 can be an AC or a DC signal. The charger 202 can cause the signal 216 to have characteristics (e.g., a defined duty cycle, amplitude, average voltage, or frequency) that correspond to a backup state of the vehicle 204. The charger 202 can transmit the signal 216 to the vehicle 204 using power from the energy storage device 218 of the charger 202.

At ACT 508, the method 500 can include receiving a first power. The vehicle 204 can direct the AC power 220 to the charger 202. The vehicle 204 can direct the AC power 220 to the vehicle 204 via the on-board charger of the vehicle 204. The AC power 220 can have a voltage sufficient for powering the low-voltage electronics 212 of the charger 202. The charger 202 can receive the AC power 220.

At ACT 510, the method 500 can include activating circuitry. The charger 202 can activate the low-voltage electronics 212 of the charger 202. The charger 202 can activate the low-voltage electronics 212 of the charger 202 using the AC power 220 from the vehicle 204. The low-voltage electronics 212 can operate to perform checks of other internal components of the charger 202 to ensure the charger 202 can operate to direct power received from the vehicle 204 to the load 206. The low-voltage electronics 212 or other circuitry of the charger 202 can query the vehicle 204 for the voltage of the battery of the vehicle 204. The vehicle 204 can respond to the query with the voltage of the battery of the vehicle 204.

At ACT 512, the method 500 can include transmitting a second signal. The charger 202 can transmit the second signal to the vehicle 204 using the AC power 220. The charger 202 can transmit the second signal to the vehicle 204 by applying a voltage to the DC connection between the charger 202 and the vehicle 204 that matches the voltage of the battery of the vehicle 204. The charger 202 can determine the voltage to apply to the DC connection based on the voltage the vehicle 204 included in the message the vehicle 204 transmitted to the charger 202.

At ACT 514, the method 500 can include receiving second power. The vehicle 204 can compare the voltage on the DC connection with the voltage of the battery of the vehicle 204. Responsive to determining the to voltage match, the vehicle 204 can close contactors of the battery of the vehicle 204 and discharge DC power from the battery across the DC connection to the charger 202.

At ACT 516, the method 500 can include directing second power. The charger 202 can receive the DC power from the DC connection. The charger 202 can invert or convert the DC power to AC power using internal circuitry. The charger 202 can direct the converted AC power to the load 206, such as through the disconnect 210.

The charger 202 can transmit a third signal to the vehicle 204. The charger 202 can transmit the third signal to the vehicle 204 by adjusting the characteristics of the signal 216. The charger 202 can adjust the characteristics of the signal 216 to correspond to a discharging state of the vehicle 204. The vehicle 204 can receive the adjusted signal 216 and stop directing the AC power 220 to the charger 202. The vehicle 204 can continue to direct the DC power to the charger 202.

Figure 6:
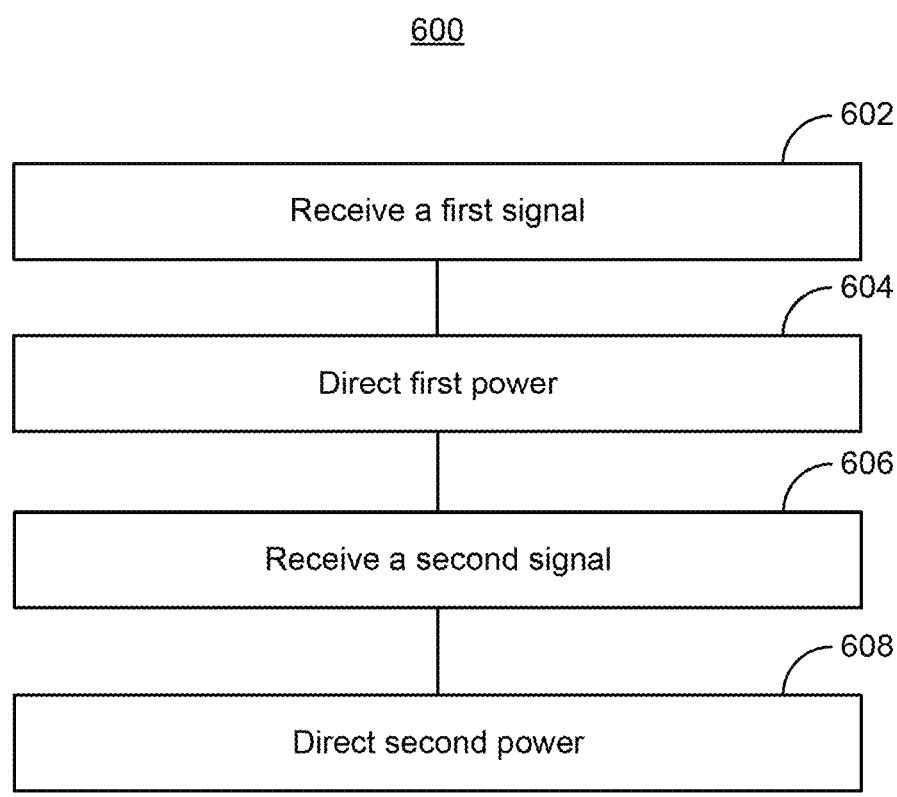
FIG. 6 depicts an example method for powering an external load, in accordance with some implementations.

FIG. 6 depicts an example method 600 for powering an external load, in accordance with some implementations. The method 600 can be performed by one or more components depicted in the system 200 or the one or more processors of the vehicle 204 of FIG. 2 or the system 300 or the one or more processors of the vehicle 304 of FIG. 3. The method 600 can include receiving a first signal (ACT 602). The method 600 can include directing first power (ACT 604). The method 600 can include receiving a second signal (ACT 606). The method 600 can include directing second power (ACT 608). By performing the method 600, a vehicle can operate to provide backup power to a charger to initiate charging of a load experiencing a blackout (e.g., a disconnect from an energy grid) or another triggering event.

At ACT 602, the method 600 can include receiving a first signal. The vehicle 204 can receive the signal 216 from the charger 202. The signal 216 can be a control pilot signal having one or more characteristics (e.g., a duty cycle, a frequency, an amplitude, or an average voltage). The vehicle 204 (e.g., via one or more processors of the vehicle 204) can analyze the characteristics of the signal. Based on the analysis, the vehicle 204 can determine the signal 216 indicates for the vehicle 204 to enter into a backup state for the charger 202.

At ACT 604, the method 600 can include directing a first power. The vehicle 204 can adjust the configuration of the vehicle 204 to enter into the backup state. In the backup state, the on-board charger (e.g., the on-board charger 155) of the vehicle 204 can direct the AC power 220 to the charger 202. The charger 202 can receive the AC power 220 and activate the low-voltage electronics 212 of the charger 202 using the AC power 220.

At ACT 606, the method 600 can include receiving a second signal. The vehicle 204 can receive the second signal as a DC voltage that the charger 202 applies to the DC connection between the charger 202 and the vehicle 204. The vehicle 204 can identify the voltage at the DC connection and compare the voltage to the voltage of the battery (e.g., one of the batteries 115 of the vehicle) of the vehicle 204. Responsive to determining the voltages match, the vehicle 204 can close the contactors of the battery to enable discharge of the battery.

Figure 7:
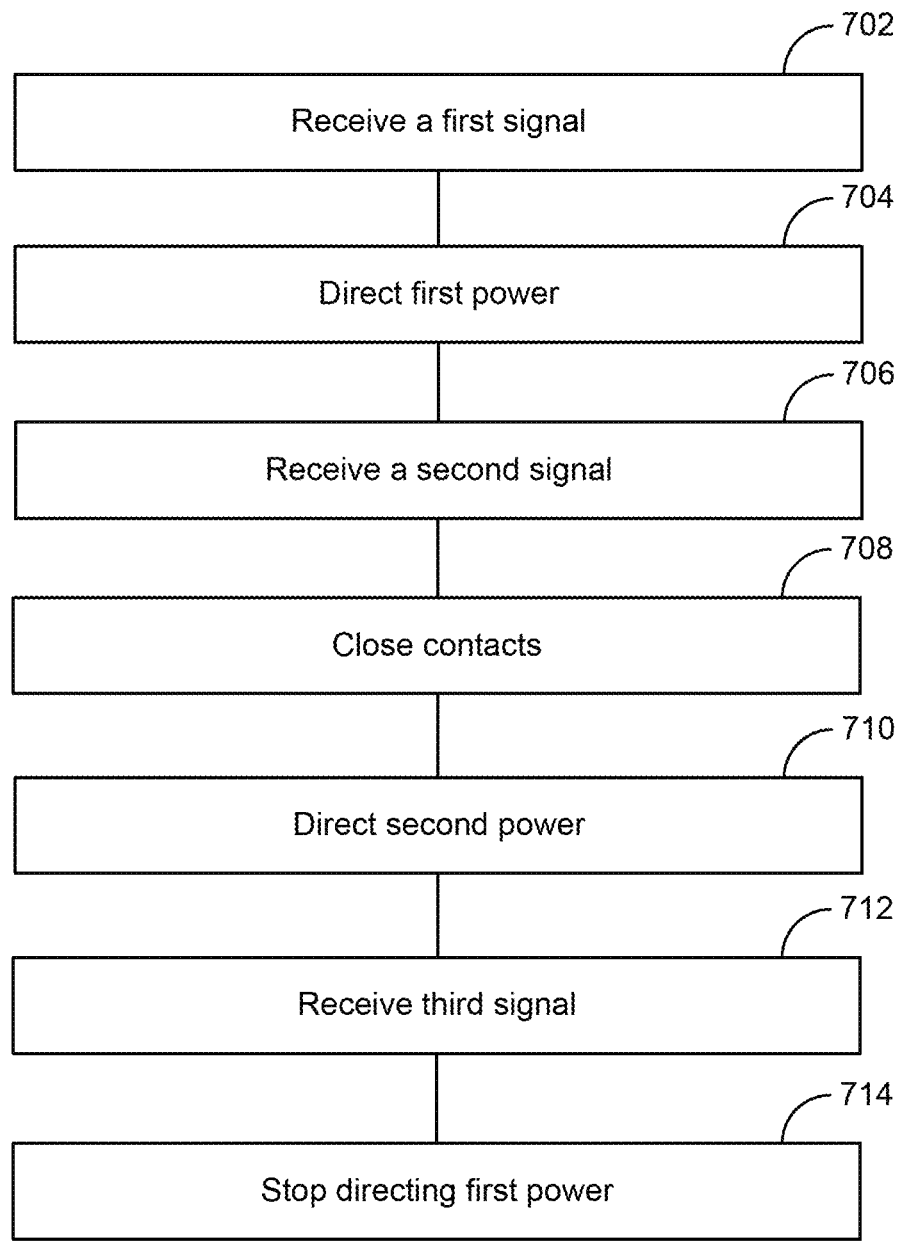
FIG. 7 depicts an example method for powering an external load, in accordance with some implementations.

FIG. 7 depicts an example method 700 for powering an external load, in accordance with some implementations. The method 700 can be performed by one or more components depicted in the system 200 or the one or more processors of the vehicle 204 of FIG. 2 or the system 300 or the one or more processors of the vehicle 304 of FIG. 3. The method 700 can include receiving a first signal (ACT 702). The method 700 can include directing first power (ACT 704). The method 700 can include receiving a second signal (ACT 706). The method 700 can include closing contacts (ACT 708). The method 700 can include directing second power (ACT 710). The method 700 can include receiving a third signal (ACT 712). The method 700 can include stopping direction of the first power (ACT 714). By performing the method 700, a vehicle can operate to provide backup power to a charger to initiate charging of a load experiencing a blackout (e.g., a disconnect from an energy grid) or another triggering event.

At ACT 702, the method 700 can include receiving a first signal. The vehicle 204 can receive the signal 216 from the charger 202. The signal 216 can be a control pilot signal having one or more characteristics (e.g., a duty cycle, a frequency, an amplitude, or an average voltage). The vehicle 204 (e.g., via one or more processors of the vehicle 204) can analyze the characteristics of the signal. Based on the analysis, the vehicle 204 can determine the signal 216 indicates for the vehicle 204 to enter into a backup state for the charger 202.

At ACT 704, the method 700 can include directing a first power. The vehicle 204 can adjust the configuration of the vehicle 204 to enter into the backup state. In the backup state, the on-board charger (e.g., the on-board charger 155) of the vehicle 204 can direct the AC power 220 to the charger 202. The charger 202 can receive the AC power 220 and activate the low-voltage electronics 212 of the charger 202 using the AC power 220.

At ACT 706, the method 700 can include receiving a second signal. The vehicle 204 can receive the second signal as a DC voltage that the charger 202 applies to the DC connection between the charger 202 and the vehicle 204. The vehicle 204 can identify the voltage at the DC connection and compare the voltage to the voltage of the battery (e.g., one of the batteries 115 of the vehicle) of the vehicle 204. Responsive to determining the voltages match, at ACT 708, the vehicle 204 can close the contactors of the battery (e.g., close the switch of the battery to close the circuit connecting the battery with the other components of the vehicle 204) to enable discharge of the battery.

At ACT 710, the method 700 can include directing a second power. The vehicle 204 can direct the DC power 222 to the charger 202. The vehicle 204 can direct the DC power 222 by discharging the battery of the vehicle 204. The charger 202 can receive the DC power 222, convert the DC power 222 into the AC power 224, and direct the AC power 224 to the load 206.

At ACT 712, the method 700 can include receiving a third signal. The vehicle 204 can receive the third signal through the same connection as the as the first signal. The third signal can be the signal 216 from the charger 202 but have adjusted characteristics. The vehicle 204 (e.g., via one or more processors of the vehicle 204) can analyze the characteristics of the adjusted signal 216. Based on the analysis, the vehicle 204 can determine the signal 216 indicates for the vehicle 204 to enter into a discharging state in which the vehicle 204 does not direct the AC power 220 but continues to discharge the battery to the load 206.

At ACT 714, the method 700 can include stopping direction of the first power. The vehicle 204 can adjust the state of the vehicle 204 to the discharging state. The vehicle 204 can do so by stopping direction of the AC power 220 to the load 206. The vehicle 204 can continue to discharge the battery to direct the DC power 222 to the charger 202 to charge the load 206.

In the system 300, the vehicle 304 and the charger 302 can similarly power the load 306. For example, using power from the energy storage device 316, the charger 302 can transmit the signal 320 with characteristics that indicate for the vehicle 304 to enter into the backup state. The vehicle 304 can identify the characteristics of the signal 320 and enter into the backup state in which the vehicle 304 directs the power 322 to the charger 302 to power the low-voltage electronics 312 of the charger 302. The charger 302 can activate the low-voltage electronics 312 using the power 322 and adjust the signal 320 to indicate for the vehicle 304 to enter into the discharging state. The vehicle 304 can identify the adjusted characteristics and increase the power 322 (e.g., increase the amplitude of the power 322). The charger 302 can receive the increased AC power and direct the increased power to the load 306 as the power 324.

FIG. 8 depicts an example block diagram of the controller 214 or the controller 160, in accordance with some implementations. For example, the controller 214 can include or be used to implement an electronic control unit (e.g., a data processing system) or its components. The controller 214 can include at least one bus 805 or other communication component for communicating information and at least one processor 810 or processing circuit coupled to the bus 805 for processing information. The controller 214 can also include one or more processors 810 or processing circuits coupled to the bus for processing information. The controller 214 can also include at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The controller 214 can further include at least one read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions.

The controller 214 can be coupled via the bus 805 to a display 835, such as a liquid crystal display, or active matrix display, for displaying information to a user such as a driver of the vehicle 105 or other end user. An input device 830, such as a keyboard or voice interface can be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the controller 214 in response to the processor 810 executing an arrangement of instructions contained in main memory 815. Such instructions can be read into main memory 815 from another computer-readable medium, such as the storage device 825. Execution of the arrangement of instructions contained in main memory 815 causes the controller 214 to perform the illustrative processes described herein. One or more processors in a multi-processing arrangement can also be employed to execute the instructions contained in main memory 815. Hard-wired circuitry can be used in place of or in combination with software instructions together with the systems and methods described herein. Systems and methods described herein are not limited to any specific combination of hardware circuitry and software. The controller 160 of the vehicle 105 can include the same or similar components to the controller 214.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a charger to electrically connect with a vehicle; and
the charger to:
transmit, responsive to occurrence of a triggering event, a first signal to the vehicle, the first signal having a first voltage to cause the vehicle to direct a first power to the charger;
activate circuitry of the charger with the first power, the circuitry to perform at least one status check of at least one component of the charger responsive to the activation of the circuitry with the first power;
responsive to a completion of the at least one status check by the circuitry, transmit a second signal to the vehicle, the second signal having a second voltage to cause the vehicle to direct a second power to the charger; and
supply the second power to a load connected to the charger.

2. The system of claim 1, comprising:
the circuitry to charge the load with the second power from the vehicle.

3. The system of claim 1, wherein the charger comprises:
one or more processors coupled with memory; and
the one or more processors to:
determine the occurrence of the triggering event; and
transmit the first signal to the vehicle responsive to the determination of the occurrence of the triggering event.

4. The system of claim 1, wherein the triggering event comprises the load not receiving power from an energy grid, and comprising:
one or more processors coupled with memory to:
determine the load is not receiving power from the energy grid; and
transmit the first signal to the vehicle responsive to the determination that the load is not receiving power from the energy grid.

5. The system of claim 1, wherein the charger comprises:
an energy storage device storing energy;
one or more processors coupled with memory; and
the one or more processors to:
determine the occurrence of the triggering event; and
transmit, using the energy of the energy storage device, the first signal to the vehicle responsive to the determination of the occurrence of the triggering event.

6. The system of claim 1, comprising:
the charger to:
transmit the first signal via a first connection with the vehicle;
receive the first power via a second connection with the vehicle, the first power having an alternating current voltage; and
transmit the second signal via a third connection with the vehicle, the second signal having a direct current voltage.

7. The system of claim 1, comprising:
the charger to:
transmit the first signal via a first connection with the vehicle;
receive the first power via a second connection with the vehicle, the first power having an alternating current voltage;
transmit the second signal via a third connection with the vehicle, the second signal having a direct current (DC) voltage; and
receive the second power via the third connection with the vehicle, the second power comprising the DC voltage.

8. The system of claim 1, comprising:
the charger to:
transmit, based on the second power, a third signal to the vehicle, the third signal having a duty cycle or amplitude to cause the vehicle to stop direction of the first power to the charger.

9. The system of claim 1, comprising:
the charger to:
monitor an automatic grid disconnect coupled between the charger, the load, and an energy grid; and
detect the occurrence of the triggering event in response to a determination that the automatic grid disconnect disconnected the load and the charger from the energy grid.

10. The system of claim 1, comprising:
the charger to:
transmit the second signal to the vehicle across a connection, the second signal comprising a direct current voltage, the vehicle to:
determine the direct current voltage matches a third voltage of a battery of the vehicle; and
direct the second power to the charger in response to the determination that the direct current voltage of the second signal matches the third voltage of the battery.

11. The system of claim 1, comprising:
the charger to:
transmit the first signal via a first connection with the vehicle, the first signal having a first amplitude or duty cycle;
receive the first power via a second connection with the vehicle, the first power having a first AC voltage;
adjust the first amplitude or duty cycle of the first signal to a second amplitude or duty cycle based on the first power; and receive the second power via the second connection with the vehicle, the second power having a second AC voltage higher than the first AC voltage.

12. A method, comprising:

transmitting, by a charger responsive to occurrence of a triggering event, a first signal to a vehicle, the first signal having a first voltage to cause the vehicle to direct a first power to the charger;

activating, by the charger, circuitry of the charger with the first power, the circuitry to perform at least one status check of at least one component of the charger responsive to the activating of the circuitry with the first power;

responsive to the circuitry completing the at least one status checks, transmitting, by the charger, a second signal to the vehicle, the second signal having a second voltage to cause the vehicle to direct a second power to the charger; and supplying, by the charger, the second power to a load connected to the charger.

13. The method of claim 12, comprising:

activating, by the charger with the first power, circuitry of the charger to charge the load with the second power from the vehicle.

14. The method of claim 12, comprising:

determining, by one or more processors of the charger, the occurrence of the triggering event; and transmitting, by the one or more processors, the first signal to the vehicle responsive to the determining the occurrence of the triggering event.

15. The method of claim 12, comprising:

transmitting, by the charger, the first signal via a first connection with the vehicle;

receiving, by the charger, the first power via a second connection with the vehicle, the first power having an alternating current voltage;

transmitting, by the charger, the second signal via a third connection with the vehicle, the second signal having a first direct current (DC) voltage; and receiving, by the charger, the second power via the third connection with the vehicle, the second power comprising a second DC voltage.

16. A vehicle, comprising:

the vehicle to:

receive, responsive to occurrence of a triggering event, a first signal from a charger, the first signal having a first voltage;

direct, based on the first voltage of the first signal, a first power to the charger, wherein the charger is to:

activate circuitry of the charger with the first power, the circuitry to perform at least one status check of at least one component of the charger responsive to the activation of the circuitry with the first power; and responsive to a completion of the at least one status check by the circuitry, transmit a second signal to the vehicle, the second signal having a second voltage;

receive the second signal from the charger; and direct, based on the second voltage of the second signal, a second power to the charger, the charger supplying a load with the second power.

17. The vehicle of claim 16, comprising:

the vehicle to:

receive the first signal via a first connection with the charger;

direct the first power via a second connection with the charger, the first power comprising an alternating current voltage; and receive the second signal via a third connection with the vehicle, the second signal comprising a direct current voltage.

18. The vehicle of claim 16, comprising:

the vehicle to:

receive the first signal via a first connection with the charger;

direct the first power via a second connection with the charger, the first power comprising an alternating current voltage;

receive the second signal via a third connection with the vehicle, the second signal comprising a direct current (DC) voltage; and direct the second power via the third connection with the vehicle, the second power comprising the DC voltage.

* * * * *